(12) United States Patent
Ono (10) Patent No.: US 10,066,699 B2
(45) Date of Patent: Sep. 4, 2018

(54) CRANKSHAFT

(71) Applicant: TOYOTA JIDOSHA KABUSHIKI KAISHA, Toyota-shi, Aichi-ken (JP)

(72) Inventor: Koichi Ono, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 14/963,961

(22) Filed: Dec. 9, 2015

(65) Prior Publication Data

US 2016/0169322 A1 Jun. 16, 2016

(30) Foreign Application Priority Data

Dec. 12, 2014 (JP) ................... 2014-252275

(51) Int. Cl.
| | | |
|---|---|---|
| F16F 15/28 | (2006.01) | |
| F16C 3/20 | (2006.01) | |
| F16C 3/08 | (2006.01) | |
| F16C 3/22 | (2006.01) | |
| F02B 75/20 | (2006.01) | |
| F02B 75/18 | (2006.01) | |

(52) U.S. Cl.
CPC .............. *F16F 15/283* (2013.01); *F16C 3/20* (2013.01); *F02B 75/20* (2013.01); *F02B 2075/1816* (2013.01); *F16C 3/08* (2013.01); *F16C 3/22* (2013.01)

(58) Field of Classification Search
CPC ........ F16F 15/286; F16F 15/283; F16F 15/28; F16F 15/24; F16C 3/20; F16C 3/22; F16C 3/08; F16C 3/18; F16C 3/04; F16C 3/06; F02B 2075/1816; Y10T 74/2173–74/2177; Y10T 74/2183
See application file for complete search history.

(56) References Cited

U.S. PATENT DOCUMENTS

| | | | | |
|---|---|---|---|---|
| 1,512,479 | A * | 10/1924 | Oldson | F16C 3/20 74/603 |
| 1,645,717 | A * | 10/1927 | Oldson | F16C 3/20 74/603 |
| 1,649,541 | A * | 11/1927 | Oldson | F16C 3/20 74/603 |
| 1,661,341 | A * | 3/1928 | Oldson | F16C 3/20 200/5 A |
| 1,756,659 | A * | 4/1930 | Oldson | F16C 3/20 74/603 |
| 3,538,788 | A * | 11/1970 | Patchen | F16C 3/20 74/603 |
| 4,901,692 | A * | 2/1990 | Madden | F02B 75/20 123/192.2 |
| 7,367,303 | B2 * | 5/2008 | Yamamoto | F16C 3/08 123/192.1 |

FOREIGN PATENT DOCUMENTS

| | | |
|---|---|---|
| JP | 2001-289235 A | 10/2001 |
| JP | 2012-172797 A | 9/2012 |

* cited by examiner

*Primary Examiner* — Daniel D Yabut
(74) *Attorney, Agent, or Firm* — Oliff PLC (57) ABSTRACT

A flat plane crankshaft for an in-line four cylinder engine includes eight crank arms. A fourth crank arm and a fifth crank arm are respectively provided with counter weights. Each of a width of the fourth crank arm and a width of the fifth crank arm is configured to be smaller than a width of a second crank arm. Each of a width of the third crank arm and a width of the sixth crank arm is configured to be greater than the width of the second crank arm.

3 Claims, 4 Drawing Sheets

CRANKSHAFT

INCORPORATION BY REFERENCE

The disclosure of Japanese Patent Application No. 2014-252275 filed on Dec. 12, 2014 including the specification, drawings and abstract is incorporated herein by reference in its entirety.

BACKGROUND OF THE INVENTION

1. Field of the Invention

The present invention relates to a crankshaft for an in-line four cylinder engine.

2. Description of Related Art

A crankshaft for an in-line four cylinder engine includes: crank journals serving as a rotational center of the crankshaft; crank pins disposed at positions eccentric to the corresponding crank journals, and to which connecting rods are coupled; and crank arms that couple the respective crank journals to the corresponding crank pins.

Insufficient rigidity of crankshafts causes vibrations or the like during rotation thereof; therefore, partial reinforcement is often provided to the crankshafts so as to secure sufficient rigidity. An example of such partial reinforcement for securing the rigidity may include a crankshaft described in Japanese Patent Application Publication No. 2012-172797. In the crankshaft described in JP 2012-172797 A, in order to suppress generation of torsional vibrations at the crank arms near a flywheel because of vibrations of the flywheel disposed at a shaft end of the crankshaft, the crank arms near the flywheel are provided with partial reinforced portions so as to enhance rigidity of the crank arms.

SUMMARY OF THE INVENTION

It is possible to secure rigidity of the crankshaft by providing the crankshaft with partial reinforcement. Unfortunately, simply providing such reinforcement rather results in increase in weight of the crankshaft. Increase in weight of the crankshaft causes increase in moment of inertia of the crankshaft, so that inconvenience, such as deterioration of fuel efficiency and increase in weight of an engine, is caused. Hence, ensuring rigidity and maximum reduction in weight are both desired in designing of crankshafts.

The present invention provides a crankshaft having a light weight and a high rigidity.

The crankshaft for solving the above problems is a flat plane crankshaft for an in-line four cylinder engine including: five crank journals; four crank pins; and eight crank arms. A fourth crank arm that is a crank arm at a fourth position counted from one of both shaft ends of the crankshaft and a fifth crank arm that is a crank arm at a fifth position counted from the shaft end are respectively provided with counter weights.

If the width of each crank arm is defined to be a maximum value of a dimension of the crank arm between a central axis of the crank journal and a central axis of the crank pin in a direction orthogonal to a line segment vertically extending through the central axis of the crank journal and the central axis of the crank pin if the crank arm is viewed from the shaft end of the crankshaft, each width of the fourth crank arm and the fifth crank arm is configured to be smaller than a width of a second crank arm that is a crank arm at a second position counted from the shaft end. Each width of a third crank arm that is a crank arm at a third position counted from the shaft end and a sixth crank arm that is a crank arm at a sixth position counted from the shaft end is configured to be greater than the width of the second crank arm.

The above described "width" in the aforementioned configuration excludes a dimension of a projecting portion (e.g., boss portion or the like where a stamp or the like is provided), which is a portion projecting from the crank arm, and affects less influence on the rigidity and weight of this crank arm.

The crank arm may be provided with a counter weight on an opposite side to the corresponding crank pin relative to the corresponding journal. As the crank arm has a smaller weight so as to decrease a rotation moment of this crank arm, it is possible to reduce more weight and more dimension of the counter weight disposed to this crank arm.

Each width of the fourth crank arm and the fifth crank arm that are provided with the counter weights is configured to be smaller than the width of the second crank arm. Hence, compared with the case of configuring each width of the fourth crank arm and the fifth crank arm to be equal to the width of the second crank arm, it is possible to reduce each weight of the fourth crank arm and the fifth crank arm. In each of the fourth crank arm and the fifth crank arm, the weight of the crank arm between the corresponding crank journal and the corresponding crank pin becomes smaller, and thus as aforementioned, it is possible to reduce each weight of the counter weights respectively provided to the fourth crank arm and the fifth crank arm. By configuring each width of the fourth crank arm and the fifth crank arm to be smaller than the width of the second crank arm, it is possible to reduce not only each weight of the fourth crank arm and the fifth crank arm, but also each weight of the counter weights thereof, thereby effectively reducing the weight of the crankshaft.

If each width of the fourth crank arm and the fifth crank arm is configured to be smaller than the width of the second crank arm, rigidity of the fourth crank arm and the fifth crank arm becomes deteriorated.

To cope with this, in the crankshaft for an in-line four cylinder engine, the third crank arm that is a crank arm at the third position counted from the shaft end is fixed to the crank pin fixed to the fourth crank arm, and the third crank arm and the fourth crank arm serve as a pair of crank arms that support the crank pin. Similarly, the sixth crank arm that is a crank arm at the sixth position counted from the shaft end is fixed to the crank pin fixed to the fifth crank arm, and the fifth crank arm and the sixth crank arm also serve as a pair of crank arms that support the crank pin.

In the above configuration, the width of the third crank arm paired with the fourth crank arm is configured to be greater than the width of the second crank arm. Accordingly, compared with the case of configuring the width of the third crank arm to be equal to the width of the second crank arm, the third crank arm has a greater rigidity. Even if the rigidity of the fourth crank arm becomes decreased, the rigidity of the third crank arm becomes enhanced, thus suppressing deterioration of overall rigidity of the pair of crank arms. Accordingly, it is possible to suppress deterioration of the rigidity of the crankshaft owing to reduction in weight of the fourth crank arm.

Similarly, in the above configuration, the width of the sixth crank arm paired with the fifth crank arm is configured to be greater than the width of the second crank arm. Accordingly, compared with the case of configuring the width of the sixth crank arm to be equal to the width of the second crank arm, the sixth crank arm has a greater rigidity. Even if the rigidity of the fifth crank arm becomes decreased, the rigidity of the sixth crank arm becomes enhanced, thus suppressing deterioration of overall rigidity of the pair of crank arms. Accordingly, it is possible to suppress deterioration of the rigidity of the crankshaft owing to reduction in weight of the fifth crank arm.

According to the above configuration, it is possible to reduce the weight of the crankshaft as well as suppress deterioration of the rigidity of the crankshaft owing to reduction in weight thereof; therefore it is possible to attain a crankshaft having a light weight and a high rigidity.

On the other hand, as the width of the crank arm is decreased, the rigidity of this crank arm becomes deteriorated. It should be noted that the rigidity of the crank arm tends to become significantly deteriorated if the width of the crank arm becomes smaller than the diameter of the corresponding crank journal. To cope with this, in the aforementioned crankshaft, it is preferable that each width of the fourth crank arm and the fifth crank arm is configured to be greater than the diameter of the crank journal disposed between the fourth crank arm and the fifth crank arm.

According to the above configuration, it is possible to suppress significant deterioration of the rigidity of the crank arms owing to decrease in width of the crank arms. In the aforementioned crankshaft, it is preferable that both a ratio of the width of the third crank arm relative to the width of the fourth crank arm, and a ratio of the width of the sixth crank arm relative to the width of the fifth crank arm are configured to be an identical ratio within a range of 1.03 to 1.26.

According to the above configuration, compared with the case of configuring the width of the third crank arm, the width of the fourth crank arm, the width of the fifth crank arm, and the width of the sixth crank arm to be all the same, it is possible to reduce the weight of the crankshaft while maintaining the rigidity of the crankshaft to be equivalent to the comparative case.

In the above configuration, the ratio of the width of the third crank arm relative to the width of the fourth crank arm denotes a ratio represented by (H3/H4) if the width of the fourth crank arm is defined as H4, and the width of the third crank arm is defined as H3. Similarly, the ratio of the width of the sixth crank arm relative to the width of the fifth crank arm denotes a ratio represented by (H6/H5) if the width of the fifth crank arm is defined as H5, and the width of the sixth crank arm is defined as H6.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
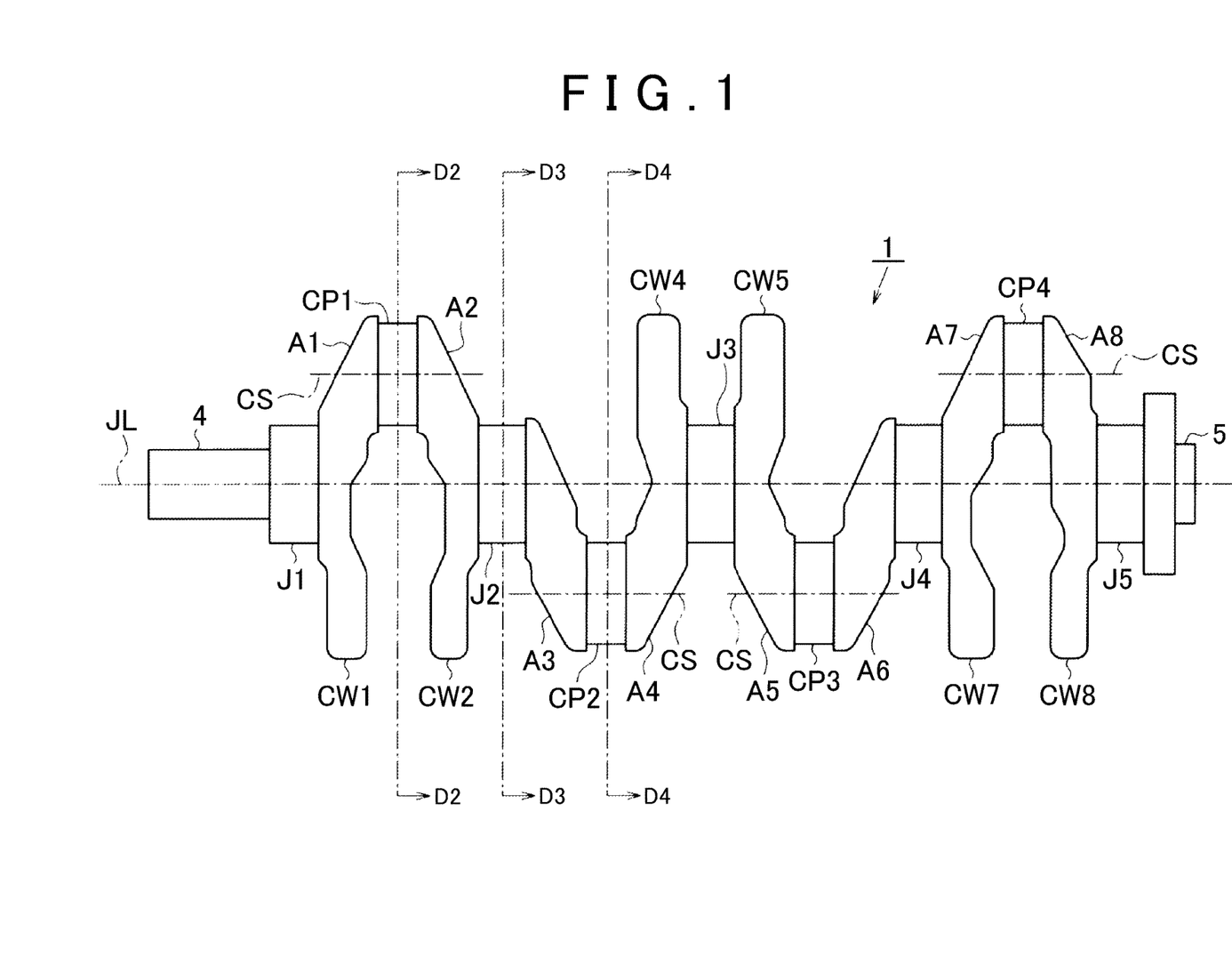
FIG. 1 is a side view showing a structure of a crankshaft according to one embodiment.

Hereinafter, one embodiment in which a crankshaft is embodied will be described with reference to FIG. 1 to FIG. 4. As shown in FIG. 1, a crankshaft 1 of the present embodiment is a flat plane crankshaft for an in-line four cylinder engine. The crankshaft is made of a manganese steel that is one of alloy steels for machine structure use, and is produced by forging.

A pulley or the like used for driving a timing belt or a fan belt is attached to a shaft end 4 of the crankshaft 1 on the left side of the drawing, for example. A flywheel averaging a shaft torque of an engine so as to attain smooth rotation is attached to a shaft end 5 of the crankshaft 1 on the right side of the drawing.

The crankshaft 1 is provided with five crank journals (hereinafter, referred to as journals) serving as a rotational center of the crankshaft 1. Hereinafter, a journal at a first position counted from the shaft end 4 is referred to as a first journal J1, a journal at a second position counted from the shaft end 4 is referred to as a second journal J2. A journal at a third position counted from the shaft end 4 is referred to as a third journal J3, a journal at a fourth position counted from the shaft end 4 is referred to as a fourth journal J4, and a journal at a fifth position counted from the shaft end 4 is referred to as a fifth journal J5. Each of the journals J1 to J5 has the same shaft diameter. Respective central axes of the journals J1 to J5 are coaxial, and coincide with the rotational central axis of the crankshaft 1. The rotational central axis of the above configured crankshaft 1 is referred to as a journal central axis JL, hereinafter.

Between every two adjacent journals J1 to J5, a crank pin to which a connecting rod is coupled is disposed at an eccentric position to the two adjacent journals. Hereinafter, a crank pin at a first position counted from the shaft end 4 is referred to as a first crank pin CP1, a crank pin at a second position counted from the shaft end 4 is referred to as a second crank pin CP2, a crank pin at a third position counted from the shaft end 4 is referred to as a third crank pin CP3, and a crank pin at a fourth position counted from the shaft end 4 is referred to as a fourth crank pin CP4. Each of the crank pins CP1 to CP4 has the same shaft diameter.

Since the crankshaft 1 is a flat plane crankshaft, the first crank pin CP1 and the fourth crank pin CP4 have the same arrangement phase in a rotational direction of the crankshaft 1. Hence, a central axis CS of the first crank pin CP1 and a central axis CS of the fourth crank pin CP4 are coaxial. In the rotational direction of the crankshaft 1, the second crank pin CP2 has an arrangement phase deviating from the arrangement phase of the first crank pin CP1 by 180°, and the third crank pin CP3 has the same arrangement phase as the arrangement phase of the second crank pin CP2. Accordingly, a central axis CS of the second crank pin CP2 and a central axis CS of the third crank pin CP3 are coaxial.

It is assumed that respective four cylinders of the in-line four cylinder engine are referred to as a first cylinder, a second cylinder, a third cylinder, and a fourth cylinder in the arrangement order thereof, a connecting rod provided to the first cylinder of the engine is coupled to the first crank pin CP1, a connecting rod provided to the second cylinder of the engine is coupled to the second crank pin CP2. A connecting rod provided to the third cylinder of the engine is coupled to the third crank pin CP3, and a connecting rod provided to the fourth cylinder of the engine is coupled to the fourth crank pin CP4.

The respective journals J1 to J5 are coupled to the corresponding crank pins CP1 to CP4 through eight crank arms. Hereinafter, a crank arm at a first position counted from the shaft end 4 is referred to as a first crank arm A1, a crank arm at a second position counted from the shaft end 4 is referred to as a second crank arm A2, a crank arm at a third position counted from the shaft end 4 is referred to as a third crank arm A3, and a crank arm at a fourth position counted from the shaft end 4 is referred to as a fourth crank arm A4. A crank arm at a fifth position counted from the shaft end 4 is referred to as a fifth crank arm A5, a crank arm at a sixth position counted from the shaft end 4 is referred to as a sixth crank arm A6, a crank arm at a seventh position counted from the shaft end 4 is referred to as a seventh crank arm A7, and a crank arm at an eighth position counted from the shaft end 4 is referred to as an eighth crank arm A8.

The first journal J1 and the first crank pin CP1 are coupled to each other through the first crank arm A1. The first crank pin CP1 and the second journal J2 are coupled to each other through the second crank arm A2. The second journal J2 and the second crank pin CP2 are coupled to each other through the third crank arm A3. The second crank pin CP2 and the third journal J3 are coupled to each other through the fourth crank arm A4. The third journal J3 and the third crank pin CP3 are coupled to each other through the fifth crank arm A5. The third crank pin CP3 and the fourth journal J4 are coupled to each other through the sixth crank arm A6. The fourth journal J4 and the fourth crank pin CP4 are coupled to each other through the seventh crank arm A7. The fourth crank pin CP4 and the fifth journal J5 are coupled to each other through the eighth crank arm A8.

The second crank arm A2, the third crank arm A3, and the fourth crank arm A4 have respective different shapes. The second crank arm A2 and the seventh crank arm A7 are formed in the same shape. The third crank arm A3 and the sixth crank arm A6 are formed in the same shape. The fourth crank arm A4 and the fifth crank arm A5 are formed in the same shape.

Based on results of tests and simulations previously conducted, each shape of the second crank arm A2 and the seventh crank arm A7 is so defined as to have weight as small as possible while securing various rigidity properties, such as flexural rigidity and torsional rigidity, which are required in each crank arm.

Each crank arm except for the third crank arm A3 and the sixth crank arm A6 is provided with a counter weight on an opposite side to the corresponding crank pin relative to the corresponding journal. These counter weights are weights for restoring balance to a rotation inertia force generated by movements of pistons and the connecting rods, and these counter weights are so provided as to reduce loads acting on the respective journals. Hereinafter, a counter weight provided to the first crank arm A1 is referred to as a first counter weight CW1, a counter weight provided to the second crank arm A2 is referred to as a second counter weight CW2, and a counter weight provided to the fourth crank arm A4 is referred to as a fourth counter weight CW4. A counter weight provided to the fifth crank arm A5 is referred to as a fifth counter weight CW5, a counter weight provided to the seventh crank arm A7 is referred to as a seventh counter weight CW7, and a counter weight provided to the eighth crank arm A8 is referred to as an eighth counter weight CW8.

The fourth counter weight CW4 and the fifth counter weight CW5 are formed in the same shape. In the present embodiment, the first counter weight CW1, the second counter weight CW2, the seventh counter weight CW7, and the eighth counter weight CW8 have respective different shapes. However, each shape of the first counter weight CW1, the second counter weight CW2, the seventh counter weight CW7, and the eighth counter weight CW8 may be appropriately changed.

Figure 2:
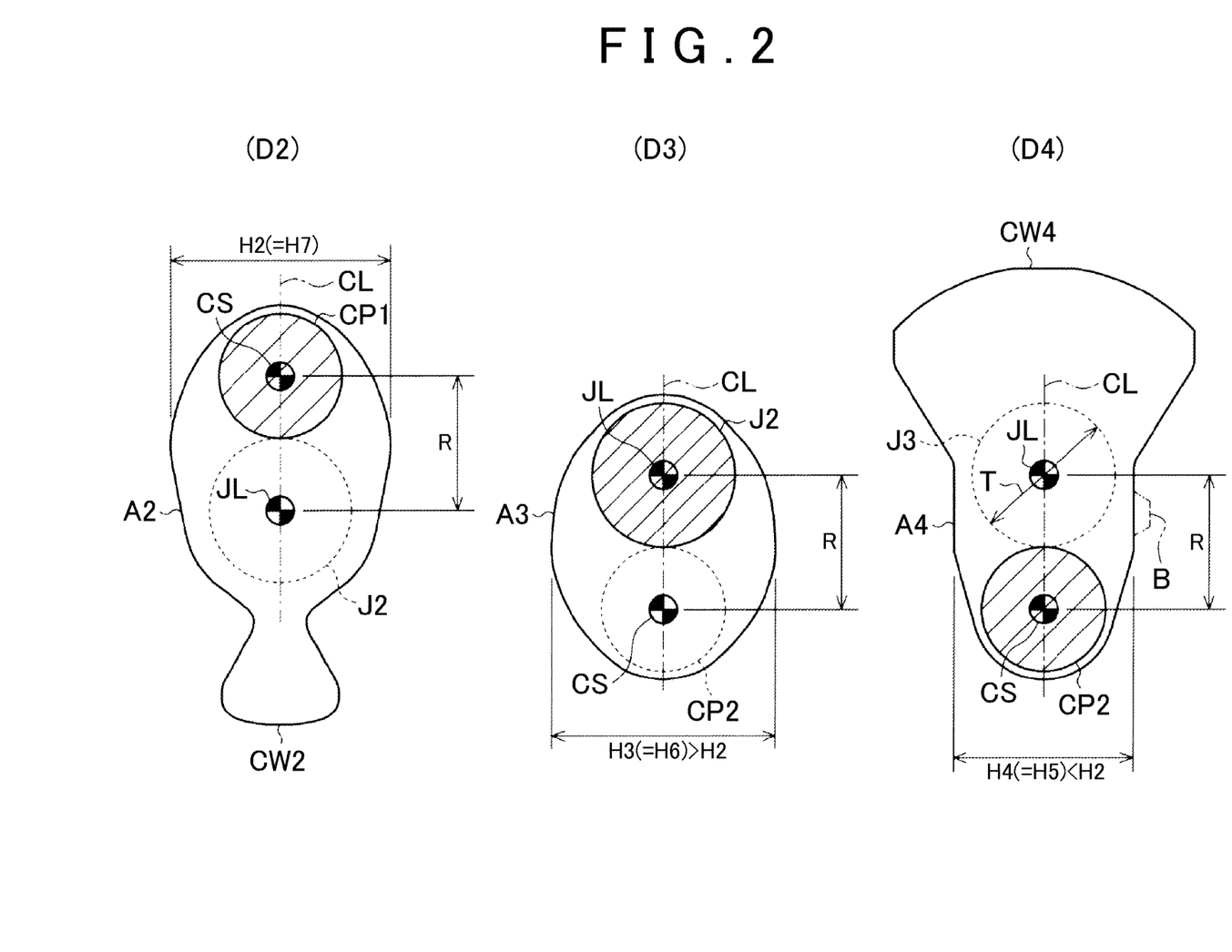
FIG. 2 (D2) is a sectional view taken along line D2-D2 as shown in FIG. 1, (D3) is a sectional view taken along line D3-D3 as shown in FIG. 1, and (D4) is a sectional view taken along line D4-D4 as shown in FIG. 1.

FIG. 2 shows a front view of each crank arm as viewed from the shaft end 4 of the crankshaft 1. More specifically, FIG. 2 (D2) shows a front view of the second crank arm A2 as viewed from the shaft end 4. FIG. 2 (D3) shows a front view of the third crank arm A3 as viewed from the shaft end 4. FIG. 2 (D4) shows a front view of the fourth crank arm A4 as viewed from the shaft end 4.

As shown in FIG. 2, hereinafter, if one of the crank arms is viewed from the shaft end 4 of the crankshaft 1, a width of the concerned crank arm is defined to be a maximum value of a dimension of the crank arm within a range R between the journal central axis JL and the central axis CS of the crank pin in a direction orthogonal to a line segment CL vertically extending through the journal central axis JL and the central axis CS of the crank pin.

Hence, as shown in FIG. 2 (2D), if the second crank arm A2 is viewed from the shaft end 4 of the crankshaft 1, a width H2 of the second crank arm A2 is defined to be a maximum value of a dimension of the second crank arm A2 in the range R between the journal central axis JL and the central axis CS of the first crank pin CP1 in the direction orthogonal to the line segment CL vertically extending through the journal central axis JL and the central axis CS of the first crank pin CP1. As aforementioned, the second crank arm A2 and the seventh crank arm A7 have the same shape, and thus a width H7 of the seventh crank arm A7 and the width H2 of the second crank arm A2 are the same.

As shown in FIG. 2 (D3), if the third crank arm A3 is viewed from the shaft end 4 of the crankshaft 1, a width H3 of the third crank arm A3 is defined to be a maximum value of a dimension of the third crank arm A3 in the range R between the journal central axis JL and the central axis CS of the second crank pin CP2 in the direction orthogonal to the line segment CL vertically extending through the journal central axis JL and the central axis CS of the second crank pin CP2. As aforementioned, the third crank arm A3 and the sixth crank arm A6 have the same shape, and thus a width H6 of the sixth crank arm A6 and the width H3 of the third crank arm A3 are the same.

Furthermore, as shown in FIG. 2 (D4), if the fourth crank arm A4 is viewed from the shaft end 4 of the crankshaft 1, a width H4 of the fourth crank arm A4 is defined to be a maximum value of a dimension of the fourth crank arm A4 in the range R between the journal central axis JL and the central axis CS of the second crank pin CP2 in the direction orthogonal to the line segment CL vertically extending through the journal central axis JL and the central axis CS of the second crank pin CP2. As aforementioned, the fourth crank arm A4 and the fifth crank arm A5 have the same shape, and thus a width H5 of the fifth crank arm A5 and the width H4 of the fourth crank arm A4 are the same. As indicated by a two-dot chain line in FIG. 2 (D4), each aforementioned width of the crank arms excludes a dimension of a projecting portion B (e.g., boss portion or the like where a stamp or the like is provided), which is a portion projecting from the crank arm, and affects less influence on the rigidity and weight of the crank arm.

With respect to each width of the crank arms as above defined, in the present embodiment, each of the width H4 of the fourth crank arm A4 and the width H5 of the fifth crank arm A5 is configured to be smaller than the width H2 of the second crank arm A2. As shown in FIG. 2 (D4), each of the width H4 of the fourth crank arm A4 and the width H5 of the fifth crank arm A5 is configured to be greater than a diameter T of the third journal J3 disposed between the fourth crank arm A4 and the fifth crank arm A5.

Each of the width H3 of the third crank arm A3 and the width H6 of the sixth crank arm A6 is configured to be greater than the width H2 of the second crank arm A2. Both a ratio of the width H3 of the third crank arm A3 relative to the width H4 of the fourth crank arm A4, that is, a ratio represented by (H3/H4), and a ratio of the width H6 of the sixth crank arm A6 relative to the width H5 of the fifth crank arm A5, that is, a ratio represented by (H6/H5) are defined to be an identical ratio within a range of 1.03 to 1.26.

As aforementioned, the crankshaft 1 is configured to include the crank arms having different widths, and thus the following effects are attained. Specifically, as the weight of the crank arm of interest is reduced so as to decrease a rotation moment of the crank arm, it is possible to reduce more weight and more dimension of the counter weight disposed to the crank arm. Each of the width H4 of the fourth crank arm A4 provided with the fourth counter weight CW4 and the width H5 of the fifth crank arm A5 provided with the fifth counter weight CW5 is configured to be smaller than the width H2 of the second crank arm A2. Hence, compared with the case of configuring each of the width H4 of the fourth crank arm A4 and the width H5 of the fifth crank arm A5 to be equal to the width H2 of the second crank arm A2, it is possible to reduce each weight of the fourth crank arm A4 and the fifth crank arm A5.

As shown in FIG. 2, the width of the crank arm of interest in the range R between the journal central axis JL and the central axis CS of the crank pin is decreased; therefore, in the fourth crank arm A4, the weight between the third journal J3 and the second crank pin CP2 becomes reduced. Accordingly, as aforementioned, the weight of the fourth counter weight CW4 disposed to the fourth crank arm A4 can also be reduced. Similarly, in the fifth crank arm A5, the weight between the third journal J3 and the third crank pin CP3 is reduced. Accordingly, as aforementioned, the weight of the fifth counter weight CW5 disposed to the fifth crank arm A5 can also be reduced.

By configuring each of the width H4 of the fourth crank arm A4 and the width H5 of the fifth crank arm A5 to be smaller than the width H2 of the second crank arm A2, it is possible to reduce not only each weight of the fourth crank arm A4 and the fifth crank arm A5, but also each weight of the counter weights disposed to the respective crank arms. Accordingly, it is possible to effectively reduce the weight of the crankshaft 1.

If each width of the fourth crank arm A4 and the fifth crank arm A5 is configured to be smaller than the width of the second crank arm A2, rigidity of the fourth crank arm A4 and the fifth crank arm A5 becomes deteriorated compared with the case of configuring each width of the fourth crank arm A4 and the fifth crank arm A5 to be equal to the width H2 of the second crank arm A2.

To cope with this, in the crankshaft 1, the third crank arm A3 is fixed to the second crank pin CP2 that is fixed to the fourth crank arm A4, and the third crank arm A3 and the fourth crank arm A4 serve as a pair of crank arms that support the second crank pin CP2. Similarly, the sixth crank arm A6 is fixed to the third crank pin CP3 that is fixed to the fifth crank arm A5, and the fifth crank arm A5 and the sixth crank arm A6 serve as a pair of crank arms that support the crank pin CP3.

The width H3 of the third crank arm A3 paired with the fourth crank arm A4 is configured to be greater than the width H2 of the second crank arm A2. Hence, compared with the case of configuring the width H3 of the third crank arm A3 to be equal to the width H2 of the second crank arm A2, the third crank arm A3 has a greater rigidity. Even if the rigidity of the fourth crank arm A4 becomes decreased, the rigidity of the third crank arm A3 becomes enhanced, thus suppressing deterioration of overall rigidity of the pair of crank arms. Accordingly, it is possible to suppress deterioration of the rigidity of the crankshaft 1 owing to reduction in weight of the fourth crank arm A4.

Similarly, the width H6 of the sixth crank arm A6 paired with the fifth crank arm A5 is configured to be greater than the width H2 of the second crank arm A2. Hence, compared with the case of configuring the width H6 of the sixth crank arm A6 to be equal to the width H2 of the second crank arm A2, the sixth crank arm A6 has a greater rigidity. Even if the rigidity of the fifth crank arm A5 becomes decreased, the rigidity of the sixth crank arm A6 becomes enhanced, thus suppressing deterioration of overall rigidity of the pair of crank arms. Accordingly, it is possible to suppress deterioration of the rigidity of the crankshaft 1 owing to reduction in weight of the fifth crank arm A5.

Meanwhile, as the width of the crank arm of interest is decreased, the rigidity of the crank arm is decreased. It should be noted that the rigidity of the crank arm tends to become significantly decreased if the width of the crank arm becomes smaller than the diameter of the corresponding journal. To cope with this, as aforementioned, in the crankshaft 1 according to the present embodiment, each of the width H4 of the fourth crank arm A4 and the width H5 of the fifth crank arm A5 is configured to be greater than the diameter T of the third journal J3 disposed between the fourth crank arm A4 and the fifth crank arm A5. Accordingly, it is possible to suppress significant deterioration of the rigidity of the fourth crank arm A4 and the fifth crank arm A5 owing to configuring each width of the fourth crank arm A4 and the fifth crank arm A5 to be smaller than the width of the second crank arm A2.

Figure 3:
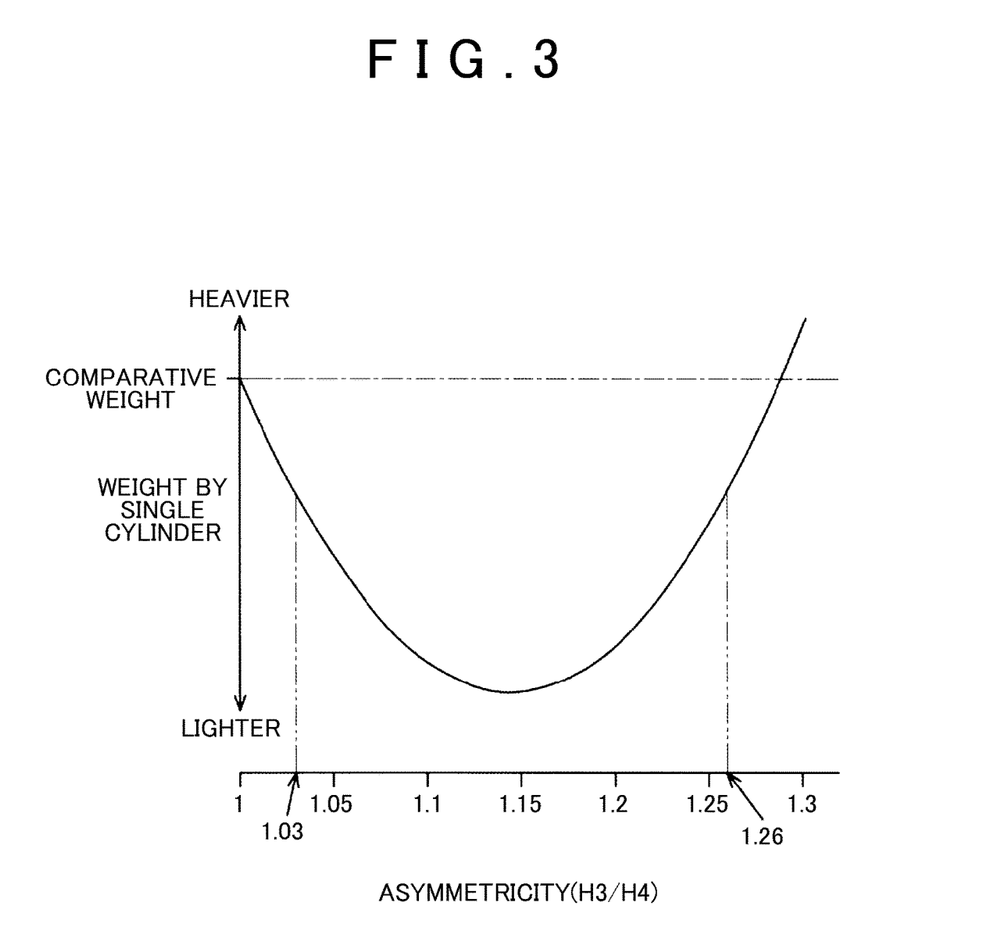
FIG. 3 is a graph showing a relation between a total weight of a crank arm and a crank pin by a single cylinder, and asymmetricity of the crank arm.

FIG. 3 shows a test result regarding change in weight of the crankshaft 1 by a single cylinder if the ratio of the width H3 of the third crank arm A3 relative to the width H4 of the fourth crank arm A4 (H3/H4) is changed under a condition to ensure rigidity of the crankshaft equivalent to rigidity of the crankshaft obtained by configuring each of the width H4 of the fourth crank arm A4 and the width H3 of the third crank arm A3 to be equal to the width H2 of the second crank arm A2. "Asymmetricity" as shown in FIG. 3 denotes the aforementioned ratio of the width H3 of the third crank arm A3 relative to the width H4 of the fourth crank arm A4. "Weight by single cylinder" as shown in the graph of FIG. 3 denotes a weight of the crankshaft 1 corresponding to the second cylinder, more specifically, a total value of respective weights of the third crank arm A3, the fourth crank arm A4, the fourth counter weight CW4, and the second crank pin CP2. "Comparative weight W1" as shown in the graph of FIG. 3 is a comparative example relative to the crankshaft 1 of the present embodiment, and corresponds to a "weight by single cylinder" in which the "asymmetricity is "1", that is," the fourth crank arm A4 and the third crank arm A3 have the same shape, and the width H4 of the fourth crank arm A4 and the width H3 of the third crank arm A3 are the same.

As shown in FIG. 3, if the asymmetricity was in a range of more than "1" to not more than "1.14", as the asymmetricity became greater, the "weight by single cylinder" became smaller than the comparative weight W1. If the asymmetricity became more than "1.14", the "weight by single cylinder" having been on a decreasing trend reversely became increased, and if the asymmetricity further became increased to exceed the vicinity of "1.29", the "weight by single cylinder" became greater than the comparative weight W1.

The fourth crank arm A4 and the fifth crank arm A5 had the same shape, and the third crank arm A3 and the sixth crank arm A6 had the same shape as well. Accordingly, the test result as shown in FIG. 3 was equivalent to change in weight of the crankshaft 1 by a single cylinder in the case of changing the ratio (H6/H5) of the width H6 of the sixth crank arm A6 relative to the width H5 of the fifth crank arm A5. The "weight by single cylinder" in this case is a weight of the crankshaft 1 corresponding to the third cylinder, more specifically, a total value of the respective weights of the fifth crank arm A5, the sixth crank arm A6, the fifth counter weight CW5, and the third crank pin CP3.

Considering the test result as shown in FIG. 3, in the crankshaft 1 of the present embodiment, both the ratio (H3/H4) of the width H3 of the third crank arm A3 relative to the width H4 of the fourth crank arm A4, and the ratio (H6/H5) of the width H6 of the sixth crank arm A6 relative to the width H5 of the fifth crank arm A5 are configured to be an identical ratio within the range of 1.03 to 1.26. Compared with the case of configuring the respective widths of the third crank arm, the fourth crank arm, the fifth crank arm, and the sixth crank arm to be all the same, it is possible to reduce the weight of the crankshaft 1 while maintaining the rigidity of the crankshaft 1 to be equivalent to the comparative case.

The third journal J3 of the crankshaft 1 is fixed to the fourth crank arm A4 and the fifth crank arm A5. The second crank pin CP2 is fixed to the fourth crank arm A4, and the third crank pin CP3 is fixed to the fifth crank arm A5. Hence, both a load acting on the second crank pin CP2 and a load acting on the third crank pin CP3 act on the third journal J3. As aforementioned, in the flat plane crankshaft 1, the crank pin CP2 and the crank pin CP3 have the same arrangement phase in the rotational direction of the crankshaft 1. Hence, two loads act on the third journal J3 in the same direction.

Figure 4:
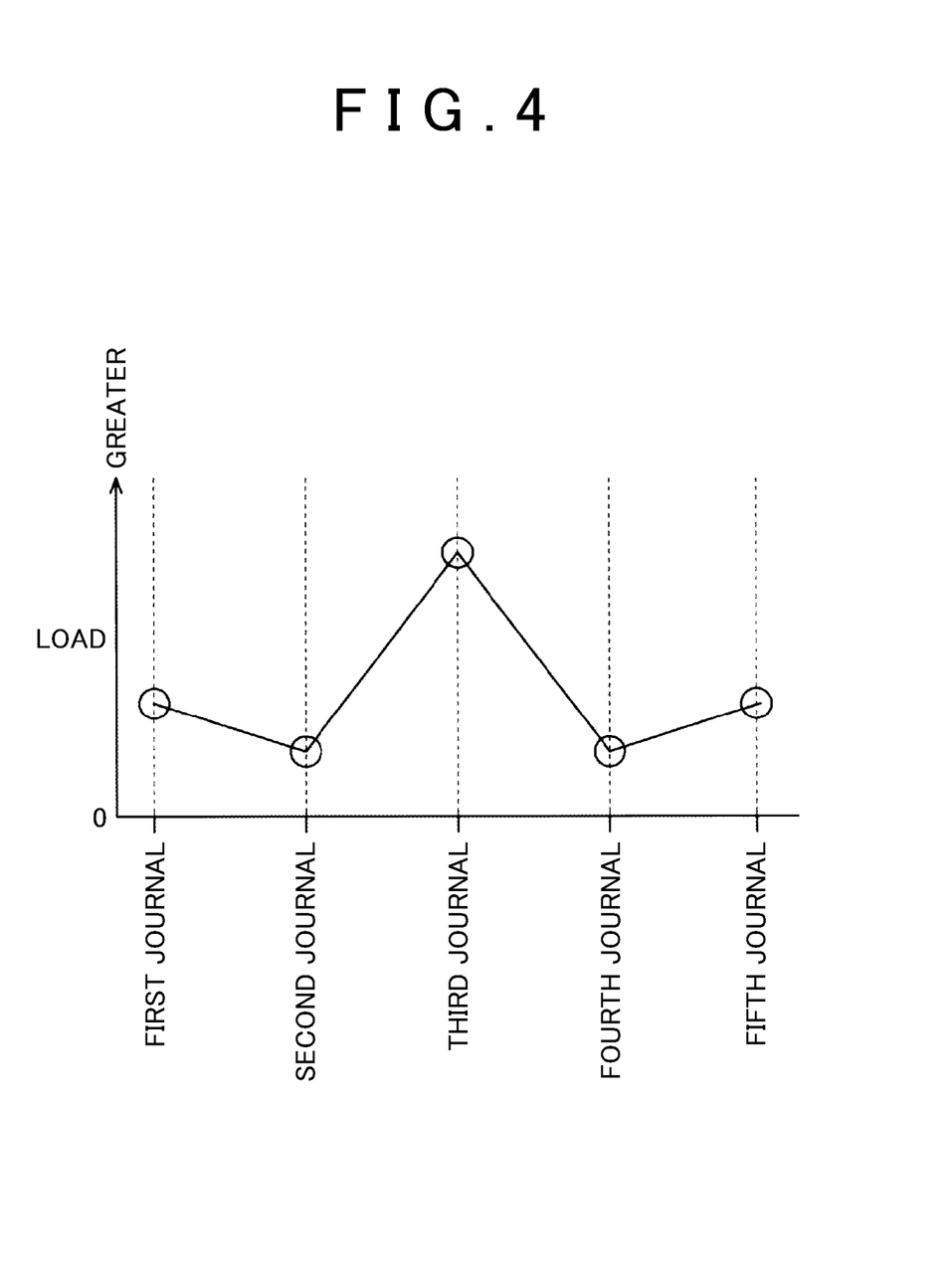
FIG. 4 is a graph showing loads acting on respective journals of the crankshaft.

Consequently, as shown in FIG. 4, in the flat plane crankshaft 1, the load acting on the third journal J3 becomes greater than a load acting on each of the other journals. In order to reduce the greater load acting on the third journal J3 as far as possible, the fourth counter weight CW4 provided to the fourth crank arm A4, and the fifth counter weight CW5 provided to the fifth crank arm A5 are configured to be greater than the counter weight of each of the other crank arms.

A diameter of a starting material of the crankshaft 1 before forging is defined depending on a maximum dimension in the radial direction of the crankshaft 1 after forging; therefore, the dimensions of the fourth counter weight CW4 and the fifth counter weight CW5 often become a factor to determine the diameter of the starting material of the crankshaft 1.

In the light of this point, as aforementioned, in the crankshaft 1 of the present embodiment, by reducing the weight of each of the fourth crank arm A4 and the fifth crank arm A5, it is possible to reduce each weight of the fourth counter weight CW4 and the fifth counter weight CW5. Hence, it is possible to decrease the dimensions of the fourth counter weight CW4 and the fifth counter weight CW5. Accordingly, the diameter of the starting material of the crankshaft 1 before forging can be decreased, thereby reducing manufacturing cost of the crankshaft 1.

According to the aforementioned present embodiment, the following advantageous effects can be attained. (1) Each of the width H4 of the fourth crank arm A4 and the width H5 of the fifth crank arm A5 is configured to be smaller than the width H2 of the second crank arm A2. Each of the width H3 of the third crank arm A3 and the width H6 of the sixth crank arm A6 is configured to be greater than the width H2 of the second crank arm A2. Accordingly, it is possible to reduce the weight of the crankshaft 1 as well as suppress deterioration of the rigidity of the crankshaft 1 owing to the reduction in weight thereof, thereby obtaining the crankshaft 1 having a light weight and a high rigidity.

(2) Each of the width H4 of the fourth crank arm A4 and the width H5 of the fifth crank arm A5 is configured to be greater than the diameter T of the third journal J3 disposed between the fourth crank arm A4 and the fifth crank arm A5. Accordingly, it is possible to suppress significant deterioration of each rigidity of the fourth crank arm A4 and the fifth crank arm A5 owing to decreasing each width of the fourth crank arm A4 and the fifth crank arm A5.

(3) Both the ratio (H3/H4) of the width H3 of the third crank arm A3 relative to the width H4 of the fourth crank arm A4, and the ratio (H6/H5) of the width H6 of the sixth crank arm A6 relative to the width H5 of the fifth crank arm A5 are configured to be an identical ratio within the range of 1.03 to 1.26. Accordingly, compared with the case of configuring the widths of the third crank arm A3 to the sixth crank arm A6 to be all the same, it is possible to reduce the weight of the crankshaft 1 while maintaining the rigidity of the crankshaft 1 to be equivalent to that of the comparative case.

(4) In the flat plane crankshaft 1, it is possible to reduce each dimension of the fourth counter weight CW4 disposed to the fourth crank arm A4 and the fifth counter weight CW5 disposed to the fifth crank arm A5, thus attaining reduction in manufacturing cost of the crankshaft 1.

The present embodiment may be changed and carried out as follows. —Each of the width H4 of the fourth crank arm A4 and the width H5 of the fifth crank arm A5 may be configured to be not more than the diameter T of the third journal J3 disposed between the fourth crank arm A4 and the fifth crank arm A5. In this case, it is also possible to attain the advantageous effects except for the above (2).

Both the ratio (H3/H4) of the width H3 of the third crank arm A3 relative to the width H4 of the fourth crank arm A4, and the ratio (H6/H5) of the width H6 of the sixth crank arm A6 relative to the width H5 of the fifth crank arm A5 are configured to be the same ratio, and the ratios may also be configured to be a different ratio.

Each of the ratio (H3/H4) of the width H3 of the third crank arm A3 relative to the width H4 of the fourth crank arm A4, and the ratio (H6/H5) of the width H6 of the sixth crank arm A6 relative to the width H5 of the fifth crank arm A5 is configured to be a value within the range of 1.03 to 1.26. Other than this configuration, each of the ratios may be configured to be a value out of the range of 1.03 to 1.26 as far as it is possible to reduce the weight of the crankshaft 1 as well as suppress deterioration of the rigidity of the crankshaft 1 owing to the reduction in weight thereof.

It may be configured to provide each of the third crank arm A3 and the sixth crank arm A6 with a crank weight small enough not to offset the weight reduction effect attained by decreasing each width of the fourth crank arm A4 and the fifth crank arm A5.

The crankshaft 1 is formed of a manganese steel, but may also be formed of another alloy steel for machine structure use. In such a case, the following alloy steels may be employed: a chromium steel, a manganese chromium steel, a vanadium steel, a leaded free cutting steel, and a sulfur free cutting steel. In these alloy steels for machine structure use, it is preferable to use an alloy steel having a carbon content of 0.5% or less. The crankshaft 1 may also be formed of a carbon steel for machine structure use.

The crankshaft 1 is formed by using a forging, and may also be formed by using a casting.

What is claimed is:

1. A flat plane crankshaft for an in-line four cylinder engine, the crankshaft comprising:
    five crank journals;
    four crank pins; and
    eight crank arms including:
        a first crank arm being a crank arm of the eight crank arms at a first position counted from one of both shaft ends of the crankshaft;
        a second crank arm being a crank arm of the eight crank arms at a second position counted from the shaft end of the crankshaft;
        a third crank arm being a crank arm of the eight crank arms at a third position counted from the shaft end of the crankshaft;
        a fourth crank arm being a crank arm of the eight crank arms at a fourth position counted from the shaft end of the crankshaft, the fourth crank arm including a fourth counter weight of the fourth crank arm;
        a fifth crank arm being a crank arm of the eight crank arms at a fifth position counted from the shaft end of the crankshaft, the fifth crank arm including a fifth counter weight of the fifth crank arm;
        a sixth crank arm being a crank arm of the eight crank arms at a sixth position counted from the shaft end of the crankshaft;
        a seventh crank arm being a crank arm of the eight crank arms at a seventh position counted from the shaft end of the crankshaft; and
        an eighth crank arm being a crank arm of the eight crank arms at an eighth position counted from the shaft end of the crankshaft,
    each of the fourth crank arm and the fifth crank arm having a smaller width than a width of the second crank arm,
    each of the third crank arm and the sixth crank arm having a greater width than the width of the second crank arm,
    when viewed from the shaft end of the crankshaft, a width of the first crank arm, the second crank arm, the seventh crank arm, and the eighth crank arm are each defined as a maximum value of a dimension of each respective crank arm between a journal central axis, and one of a central axis of a first crank pin of the four crank pins and a central axis of a fourth crank pin of the four crank pins in a direction orthogonal to a line segment vertically extending through the journal central axis, and
    when viewed from the shaft end of the crankshaft, a width of the third crank arm, the fourth crank arm, the fifth crank arm, and the sixth crank arm are each defined as a maximum value of a dimension of each respective crank arm between the journal central axis, and one of a central axis of a second crank pin of the four crank pins and a central axis of a third crank pin of the four crank pins.

2. The crankshaft according to claim 1, wherein the width of the fourth crank arm and the width of the fifth crank arm are greater than a diameter of a crank journal of the five crank journals that is disposed between the fourth crank arm and the fifth crank arm.

3. The crankshaft according to claim 1, wherein both a ratio of the width of the third crank arm relative to the width of the fourth crank arm and a ratio of the width of the sixth crank arm relative to the width of the fifth crank arm are configured to be an identical ratio within a range of 1.03 to 1.26.

* * * * *